United States Patent
Simon et al.

(10) Patent No.: US 11,175,403 B2
(45) Date of Patent: Nov. 16, 2021

(54) OPTOELECTRONIC SENSOR DEVICE AND METHOD FOR CONTROLLING SAME

(71) Applicants: ESPROS Photonics AG, Sargans (CH); Valeo Schalter und Sensoren GmbH, Bietigheim-Bissingen (DE)

(72) Inventors: Jan Simon, Bietigheim-Bissingen (DE); Thomas Schuler, Bietigheim-Bissingen (DE); Peter Horvath, Bietigheim-Bissingen (DE); Beat De Coi, Maienfeld (CH)

(73) Assignees: ESPROS Photonics AG, Sargans (CH); Valeo Schalter und Sensoren GmbH, Bietigheim-Bissingen (DE)

( * ) Notice: Subject to any disclaimer, the term of this patent is extended or adjusted under 35 U.S.C. 154(b) by 122 days.

(21) Appl. No.: 15/952,689

(22) Filed: Apr. 13, 2018

(65) Prior Publication Data
US 2018/0299549 A1   Oct. 18, 2018

(30) Foreign Application Priority Data

Apr. 18, 2017   (EP) .................................... 17166904

(51) Int. Cl.
*G01S 17/04* (2020.01)
*G01S 7/4863* (2020.01)
(Continued)

(52) U.S. Cl.
CPC ............ *G01S 17/04* (2020.01); *G01S 7/4863* (2013.01); *G01S 7/4868* (2013.01); *G01S 17/26* (2020.01); *G01S 17/42* (2013.01); *G01S 17/894* (2020.01)

(58) Field of Classification Search
CPC .... G01S 17/026; G01S 7/4863; G01S 7/4868; G01S 17/102; G01S 17/42; G01S 17/89
See application file for complete search history.

(56) References Cited

U.S. PATENT DOCUMENTS

| 2002/0011642 A1 | 1/2002 | Dries et al. | |
| 2008/0266431 A1* | 10/2008 | Ohyama | ................. G01S 17/89 348/294 |

(Continued)

FOREIGN PATENT DOCUMENTS

| DE | 10 2012 006 869 A1 | 10/2013 |
| EP | 1 795 913 A2 | 6/2007 |

(Continued)

OTHER PUBLICATIONS

European Search Report (Application No. 1 766 904.7) dated Nov. 3, 2017.

*Primary Examiner* — Georgia Y Epps
*Assistant Examiner* — Don J Williams
(74) *Attorney, Agent, or Firm* — Burr & Brown, PLLC

(57) ABSTRACT

A flexibly usable optoelectronic sensor device for detecting an object, comprising a receiving device for receiving light backscattered after the scattering of an emitted light beam at the object, wherein the receiving device has an array of at least two receiving elements for detecting radiation and a receiving optical unit for imaging the received radiation on the array; the array is divisible and/or divided into at least two array regions, wherein the at least two array regions correspond in each case to scatterings at objects at different distances from the monitoring region and/or different brightnesses of the received radiation, and the receiving elements respectively arranged in different array regions are settable and/or set to detect with mutually different light sensitivities.

18 Claims, 3 Drawing Sheets

(51) Int. Cl.
  *G01S 7/486*   (2020.01)
  *G01S 17/42*   (2006.01)
  *G01S 17/26*   (2020.01)
  *G01S 17/894*   (2020.01)

(56) References Cited

U.S. PATENT DOCUMENTS

| | | | | |
|---|---|---|---|---|
| 2009/0009747 A1* | 1/2009 | Wolf | ............... | G01C 3/08 |
| | | | | 356/4.01 |
| 2010/0258708 A1* | 10/2010 | Meyers | ............... | G01S 17/36 |
| | | | | 250/208.1 |
| 2012/0261516 A1 | 10/2012 | Gilliland et al. | | |
| 2015/0001773 A1 | 6/2015 | Bayha et al. | | |
| 2016/0266253 A1* | 9/2016 | Kubota | ............... | G01S 17/42 |
| 2017/0293031 A1 | 10/2017 | Popp | | |
| 2017/0343653 A1* | 11/2017 | Weinberg | ............... | G01S 7/4865 |

FOREIGN PATENT DOCUMENTS

| | | |
|---|---|---|
| EP | 1 879 044 A1 | 1/2008 |
| WO | 2016/128198 A1 | 8/2016 |

\* cited by examiner

OPTOELECTRONIC SENSOR DEVICE AND METHOD FOR CONTROLLING SAME

This application claims the benefit under 35 USC § 119(a)-(d) of European Application No. 17 166 904.7 filed Apr. 18, 2017, the entirety of which is incorporated herein by reference.

FIELD OF THE INVENTION

The present invention relates to an optoelectronic sensor device for detecting an object within a monitoring region, and a method for controlling same.

BACKGROUND OF THE INVENTION

DE 10 2012 006 869 A1 describes that according to the prior art in the case of optoelectronic sensor devices, in particular, laser scanners and/or Lidar apparatuses, overdriving can be avoided by a black strip being painted or a light-nontransmissive adhesive tape being stuck onto the receiving lens in order to be able to mask out a corresponding region. The document furthermore proposes using, as an alternative thereto, a holding device for mounting a diaphragm specifically provided for this purpose.

SUMMARY OF THE INVENTION

It is an object of the present invention to be able to propose an optoelectronic sensor device which can be used more flexibly.

The object is achieved, proceeding from an optoelectronic sensor device and a control method of the type mentioned in the introduction.

The optoelectronic sensor device according to the present invention serves for detecting an object within a monitoring region, in particular, for locating it or for determining distance. In principle, the sensor device can be a laser scanner device in which a region in a monitoring area or a surface is scanned with the aid of a laser beam in order to detect, for example, the object geometry and/or the position of the object in the monitoring area. Preferably, this can be a Lidar system (Lidar: light detection and ranging), which is used primarily for optically determining distance and likewise operates with laser beams. Such a Lidar system can thus be constructed in the form of a laser scanner. A Lidar system can operate in a similar manner to a radar system, wherein here laser pulses are emitted, the backscattered light is detected and a distance to the scattering location can finally be determined from the light propagation time of the signals.

The optoelectronic sensor device according to the present invention at least comprises a receiving device for receiving the backscattered light after the scattering of the emitted light beam at the object to be measured. The receiving device is present in the form of an array, which can be present, in particular, as a matrix of at least two receiving elements for detecting radiation and with a receiving optical unit for imaging the received radiation on the array.

The sensor device according to the present invention is distinguished by the fact that the array is divisible and/or divided into at least two array regions. The array regions correspond, in accordance with the imaging of the received light by the receiving optical unit, to different distances and/or the scattering at objects in different positions from the monitoring region and therefore also have, e.g. depending on the distance of the imaged objects, different brightnesses of the received radiation. In particular, it should be expected that those regions in which objects situated nearer to the receiving device are imaged also appear brighter or have a greater brightness, since the backscattered radiation does not spread out over a very large spherical surface around the scattering point. Individual receiving elements are respectively arranged in the different array regions. The individual receiving elements in turn are settable with regard to their light sensitivity. Depending on the array region in which they lie, they are set such that they have mutually different light sensitivities and detect with different light sensitivities.

This measure enables a significantly more flexible use in the case of the sensor device according to the present invention because, in contrast to the prior art, it is not absolutely necessary for a fixedly predefined region to be masked out. Furthermore, the masking out provided according to the present invention is not as laborious or time-intensive as applying a layer of paint or an adhesive strip on a lens. Even if, as is provided as an alternative thereto in the prior art, a diaphragm fitted to a holding device can in turn be handled more simply, this conventional measure, too, from the prior art disadvantageously exhibits just as little variability as light-nontransmissive strips painted on or stuck on. Specifically, in the event of a changed arrangement of the objects in the monitoring area, it may then be necessary for this mount to be laboriously exchanged for a new mount. Furthermore, it requires additional structural space, which can be avoided according to the present invention.

It should primarily be expected that very strong and light-intensive optical signals will be detected precisely in the short-range region. However, if these regions are not positionally fixed, then they can be correspondingly imaged in different regions within the array. However, fixed diaphragms, such as are known in conventional sensor devices from the prior art, would have the effect that, on the one hand, individual receiving elements could nevertheless be overdriven if the irradiation conditions change and the regions overexposed after the change are not detected and masked out by the diaphragm. On the other hand, however, it is disadvantageously necessary to accept that the regions that are no longer overexposed but are nevertheless still masked out are no longer available for the sensor-based detection.

Finally, the present invention can eliminate the disadvantage that for every measurement situation it is necessary to produce a dedicated diaphragm which is adapted thereto and is inflexible for alterations. These disadvantages can be overcome according to the present invention by means of the newly achieved flexibility.

Furthermore, the present invention affords the advantage that, for the purpose of avoiding overexposure, it is no longer necessary merely to differentiate between receiving elements which can still receive a light signal and receiving elements which are no longer able to do this because they are covered by a diaphragm. If the light sensitivity can be set variably, then individual receiving elements can nevertheless contribute to the detection, that is to say that they are not completely masked out, yet an overexposure nevertheless does not occur because their sensitivity is merely reduced. In particular, the photoinduced electrical signal is prevented from undergoing transition to saturation.

Advantageously, in one embodiment, the receiving elements can be configured as photodiodes in order to enable a precise and highly dynamic detection. Furthermore, provision can be made, in particular, of a receiving optical unit in the form of a lens and/or in the form of an optical unit comprising at least one lens. An adaptation to the expected distances of the objects and a precise imaging on the array can also be made possible by this means.

In advantageous developments of the present invention, the light sensitivity can be set in each case in various ways.

In principle, the light detected by the receiving device is converted into an electrical signal. This signal generally passes through a signal chain within the circuit of the optoelectronic sensor device. The signal can be amplified in various ways on this path through the signal chain. In order thus to be able to set the light sensitivity, the signal amplifier provided for this purpose can be configured to be settable. A higher or lower gain can thus be set depending on the detected brightness, wherein the gain is in turn regulatable for each individual one of the receiving elements in order that this setting, too, can be adapted to the different brightness ranges within the array. If the gain factor for individual receiving elements is in turn chosen to be comparatively low, then this corresponds to a masking out in this region. A complete masking out can ideally be carried out by the signal no longer being amplified or even being completely suppressed.

In one embodiment of the present invention, the receiving elements can be configured such that firstly a conversion of the detected light signal or of the detected photons into photoinduced charge carriers is carried out, which can be carried out, in particular, in a semiconductor region configured in accordance with a diode structure. The photoinduced charge carriers can be collected, for example, in a so-called storage gate region and then be transferred to a floating diffusion, wherein these two regions can be separated by a so-called transfer gate. A transfer gate can be realized by a potential barrier between both regions, the storage gate and the floating diffusion. For the transfer from the storage gate to the floating diffusion is often carried out either by way of a change in the potential level of the storage gate and/or by way of a change in the height of the potential barrier at the transfer gate. In the floating diffusion, the photoinduced charge carriers are converted into a voltage. The voltage is processed as a further signal. Accordingly, the conversion of the charge carriers into a voltage by means of the setting of the magnitude of the generated voltage can serve to set the light sensitivity of the receiving element.

In principle, it is possible to vary the conversion gain for setting the light sensitivity, that is to say that a specific number of channels are provided in a conversion process, wherein the number of channels used can be set. This can be used in principle during the conversion of the photons into charge carriers or during the conversion of the photoinduced charge carriers into a voltage (into a voltage value).

All these measures afford the advantage that the signal generated and processed further is directly influenced for setting the light sensitivity. Moreover, a signal amplifier, the floating diffusion and/or the conversion gain can be electronically varied in a simple manner, such that an automatic adaptation of the light sensitivity is also made possible.

An automatic adaptation thus makes it possible to check, depending on the situation, which receiving elements are overexposed or whether there is the risk of individual receiving elements being overexposed, and accordingly to reduce the light sensitivity thereof or even to completely switch off said receiving elements. Such an overexposure may be brought about in the near field region, for example, if objects situated very near to the receiving device reflect back and/or backscatter light with high light intensity. In order that this automatic adaptation can advantageously be performed, a control device can advantageously be used, which accordingly performs a control, i.e. an open-loop and/or closed-loop control, of the light sensitivity of the receiving elements and/or carries out the classification of the array into the individual array regions. By virtue of such a control device, it is no longer necessary to decide beforehand what regions may be overexposed, if appropriate, as a result of which the device is also only actually usable for a specific, defined monitoring region. Instead, the sensor device automatically ensures that such an overexposure does not occur.

As already explained, the present invention furthermore makes it possible for individual regions not to be masked out, rather for the light sensitivity merely to be reduced in order to protect the corresponding regions and to achieve a better quality of the output signal and/or output image of the sensor device.

In order to be able to carry out the corresponding control, i.e. the open-loop and/or closed-loop control, in one embodiment variant of the present invention the control device can be configured to detect the brightnesses of the respective receiving elements. Accordingly, the adaptation of the light sensitivity can advantageously be carried out very precisely, specifically depending on how brightly an individual receiving element is exposed. Moreover, a dynamic adaptation of the light sensitivity is made possible if the control device reacts to how the illumination conditions of the receiving elements change in the course of monitoring. In principle, however embodiment of the invention, the light sensitivity can be changed in steps or continuously/progressively variably. If the brightness that arrives at the receiving elements is too high, the control device can also instigate a switch-off of the respective receiving element and/or a reduction of the light sensitivity to a total light insensitivity.

In one embodiment of the present invention, provision is advantageously made of a two-dimensional array as an arrangement of receiving elements. The receiving elements are thus arranged, for example, in a 2-dimensional matrix, and the predefined receiving optical unit ensures that the detected objects, depending on their position in space, are imaged onto different regions within the 2-dimensional matrix. In one particularly preferred development of the present invention, the array can function as a 3D imager, i.e. the individual receiving elements are respectively configured additionally also to measure a distance, that is to say to determine information about the distance of the detected objects.

In principle, it is conceivable that, in one exemplary embodiment of the present invention, the sensor device only comprises a receiving device and the transmitting device from which the emitted light originates, which light is intended to be reflected and/or scattered at objects in space, is provided as a separate device. In the preferred development of the present invention, however, the sensor device also comprises a transmitting device for emitting radiation. If time-of-flight methods (TOF methods) are applied, for example, or if light propagation times are determined in some other way, then it is necessary to know information about the properties of the emitted light in order, upon light being received in the receiving device, to be able to produce a corresponding temporal correlation between emitted and received signal. By way of example, it is necessary to know phase properties of modulated portions of the signal, in order to be able to derive a corresponding phase shift from which the light propagation time is then determinable.

In one particularly preferred embodiment of the present invention, this propagation time determination takes place in the context of a scanning of the monitoring region. Individual points in space or in the monitoring region are thus successively scanned, or scanned using a light beam (in general: a laser beam having defined phase properties). In this way, although the entire monitoring region is not detected simultaneously, this methodology simplifies the propagation time determination since at every point in time clarity prevails regarding the direction in which the emitted light beam was directed, i.e. the points in space from which information about possible objects therein can be expected.

Accordingly, a method according to the present invention for controlling an optical sensor device is distinguished by the fact that the array is divided into at least two array regions, wherein the array regions correspond in each case to scatterings at objects at different distances from the monitoring region and/or different brightnesses, and wherein the receiving elements are set with respect to their light sensitivity in each case depending on their position in the respective array regions. The advantages according to the present invention can be achieved by means of this control method, that is to say that, in particular, a higher degree of flexibility is achieved during the use of the sensor device because even dynamic adaptations to changing brightnesses of the received light are possible. Moreover, the manufacturing outlay for constructing a corresponding sensor device can be reduced because additional manufacturing steps such as, for example, constructing a mount with diaphragm or applying layers of paint or adhesive strips on the receiving optical unit can be obviated. Furthermore, a finer adaptation to different brightnesses can be performed since it is necessary not just to mask out individual regions with receiving elements, rather an adaptation to changed spatial brightness distributions can be carried out by reducing the light sensitivity, wherein the corresponding receiving elements, even with adapted light sensitivity, can in principle still continue to detect as long as they have not been switched off and/or completely masked.

BRIEF DESCRIPTION OF THE DRAWINGS

Exemplary embodiments of the present invention are illustrated in the drawings and are explained more specifically below with the indication of further details and advantages.

DETAILED DESCRIPTION OF THE INVENTION

Figure 1:
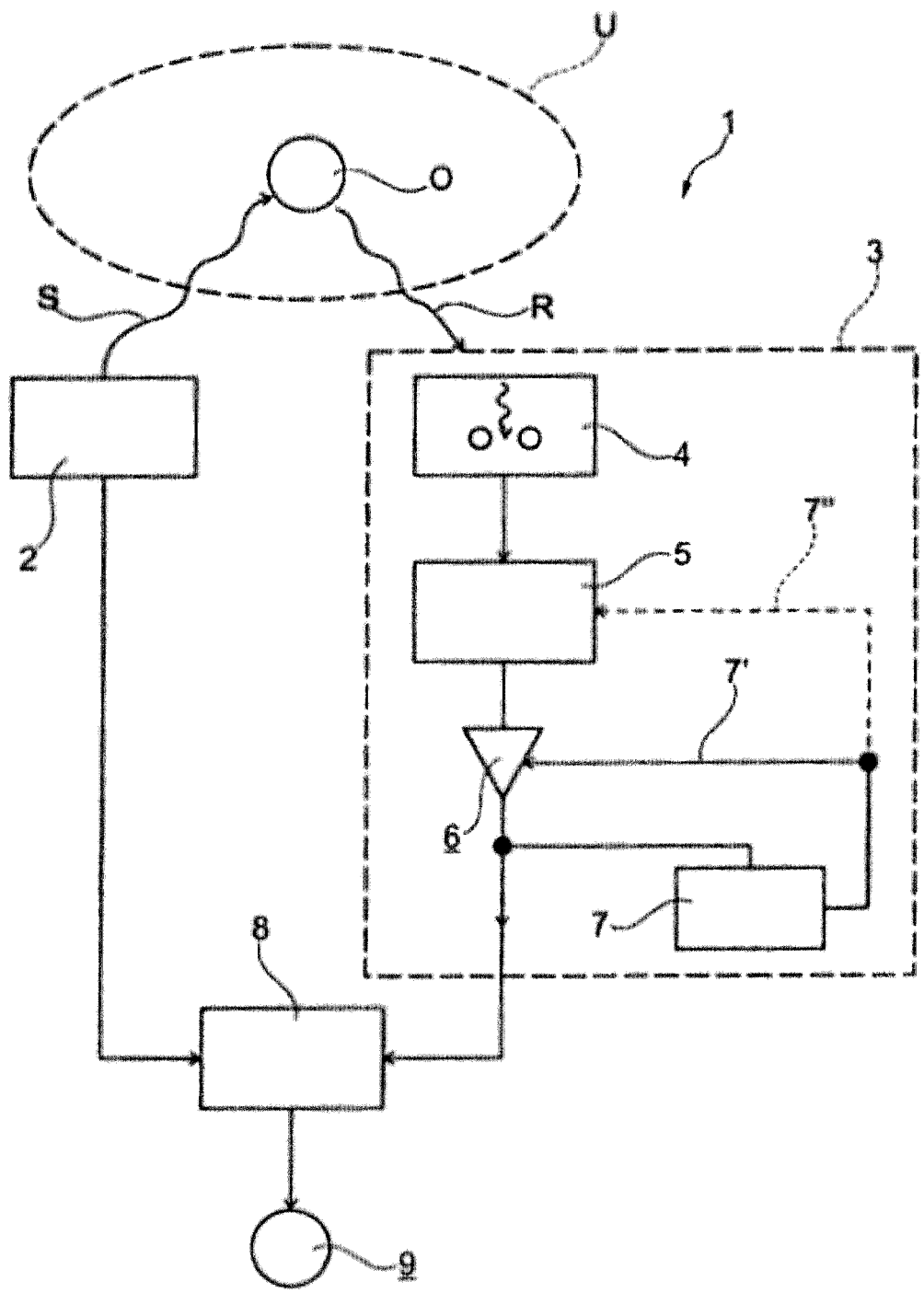
FIG. 1 shows a schematic illustration of the construction of an optoelectronic sensor device according to the present invention.

FIG. 1 shows a schematic illustration of an electronic sensor device 1 according to the present invention, which in turn has a transmitting device 2 in the form of a Lidar laser scanner and a receiving device 3. The laser scanner 2 scans the monitoring region U piece by piece by emitting a laser beam S successively into all spatial regions provided therefor. In FIG. 1, the laser beam S impinges on an object O and is scattered at the latter. One of the reflected beams R passes to the receiving device 3 and is picked up there in the detection region 4, such that a separation of charge carrier pairs can be carried out there. The photoinduced charge carriers are firstly collected and transferred to a floating diffusion 5. The quantities of photoinduced charge carriers are converted into a voltage by means of the floating diffusion 5. The signal thus generated can be amplified in an amplifier 6, which monitors by a control device 7. For this purpose, the control device 7 measures the magnitude of the signal and thus the brightness of the detected light signal. Accordingly, the control device 7 is connected to the amplifier 6 via the line 7' or to the floating diffusion 5 via the line 7" and can thus regulate either the gain at the amplifier 6 via the line 7' or else the number of channels (conversion gain) at the floating diffusion 5 via the line 7". If the brightness is too high, then the light sensitivity can be reduced by the gain or the conversion gain being reduced. The output signal of the receiving device 3 including the signal or at least one modulation signal of the transmitting device 2 is transferred to an evaluation device 8. As the end result 9, phase information and/or a pixel or the like are/is then available at the output.

Figure 2:
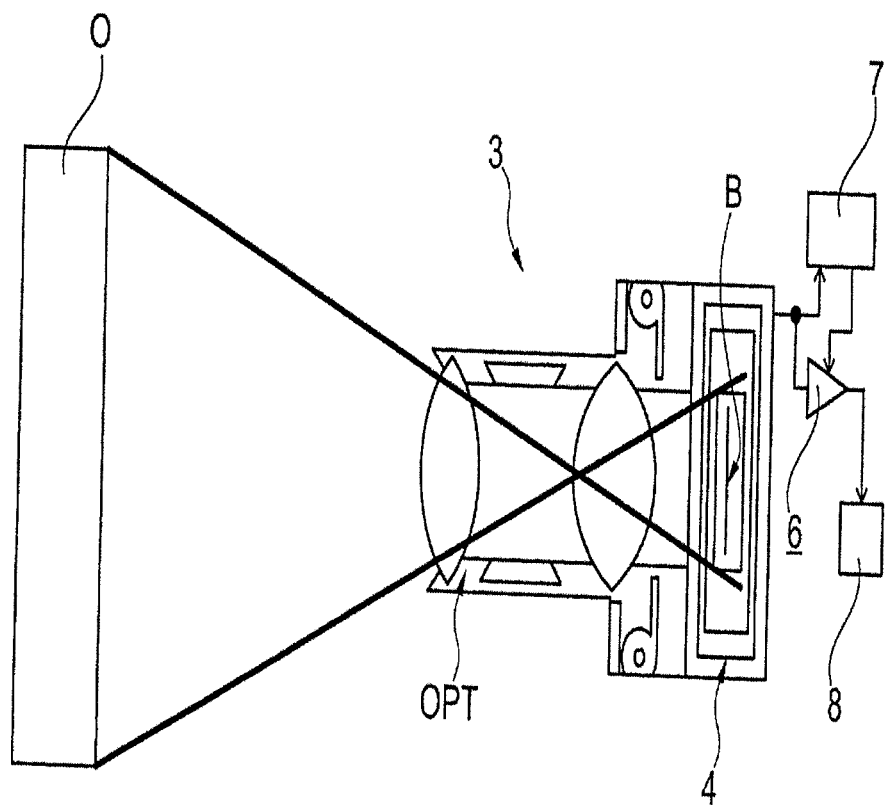
FIG. 2 shows a schematic illustration of the construction of a receiving device.

FIG. 2, in turn, shows an illustration of the receiving device 3, wherein the region 4 is illustrated as a matrix array of a 3D imager. The object O is imaged on the array 4 via a receiving optical unit OPT having lenses. The illustration furthermore schematically shows that the signals generated by the array 4 are monitored with regard to their intensity by the control unit 7 and are subsequently amplified by the amplifier 6. The gain of the amplifier 6 is in turn controlled by the control device 7. In contrast to FIG. 1, the control device 7 directly taps off the signal before the latter is amplified by the amplifier 6, and monitors the signal. The output signal is then transferred to an evaluation device 8. By way of example, here, exactly as in FIG. 1, only one output of one receiving element of the matrix 4 is illustrated, since the outputs of all the receiving elements are monitored individually by the control device 7.

The region completely masked out is identified by the reference sign B. This region would otherwise be overexposed, for which reason the control unit 7 completely reduces the light sensitivity and practically switches off the corresponding receiving elements.

Figure 3:
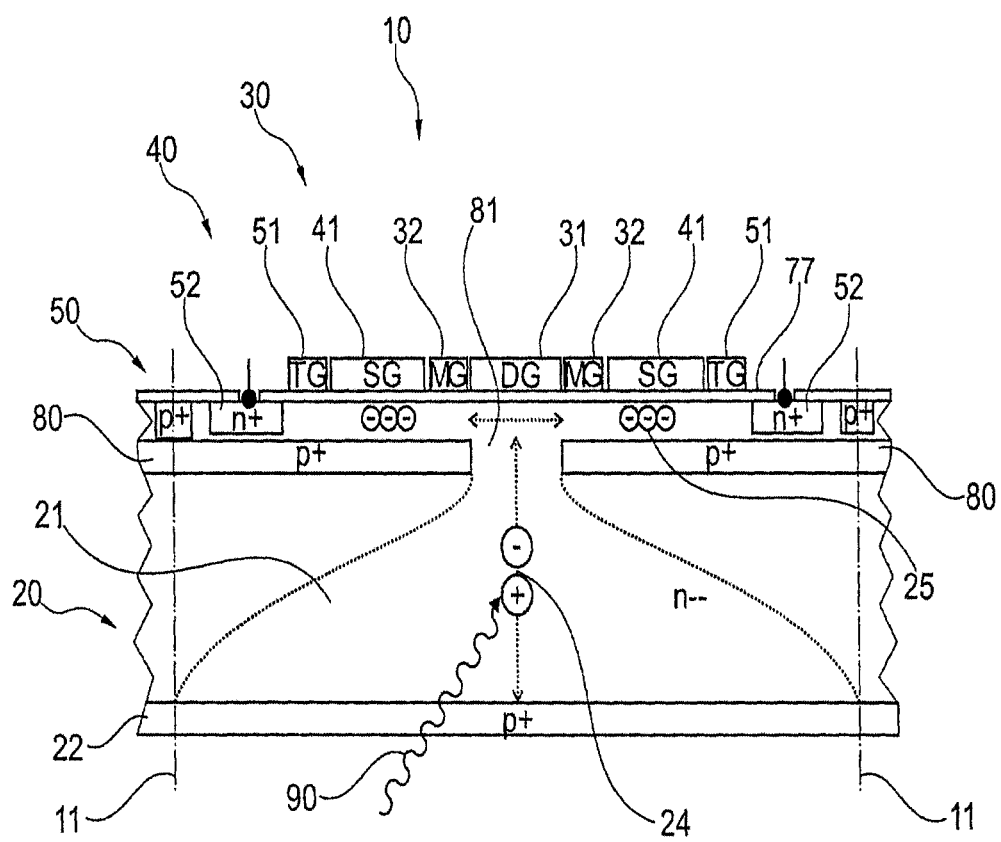
FIG. 3 shows a schematic illustration of a receiving element of the sensor device in the form of a 2-tap demodulation pixel.

As an example of a receiving element, a 2-tap demodulation pixel is schematically shown and explained in FIG. 3. The pixel 10 of the sensor has an n-doped float zone silicon semiconductor substrate 21 having a thickness of approximately 50 micrometers, with an electrical sheet resistivity of greater than or equal to 2000 ohms cm. The lateral boundaries are marked by the reference sign 11. Arranged at the surface of the semiconductor substrate, above a nonconductive SiO separating layer 77 on the substrate, there are a drift gate 31 and respectively on both sides in a symmetrical arrangement and respectively at a distance from one another a modulation gate 32, a storage gate 41, a transfer gate 51, and also within the substrate a floating diffusion 52.

The associated layers and contacts are not illustrated in specific detail. A diaphragm 80 is arranged between the gates and the transparent rear-side contact and shades the storage gates, transfer gates and the floating diffusion together with the semiconductor substrate lying below the respective gates vis-à-vis the incident reflected and/or backscattered radiation 90, wherein the diaphragm has a diaphragm aperture 81 in the region below the drift gate. The semiconductor substrate is depleted at least below the drift gate, in particular altogether. Positive potential is applied to the drift gate and the latter forms a space charge zone in the semiconductor substrate.

The separating device 30 comprises the drift gate 31 and the modulation gates 32. The storage device 40 comprises the storage gates 41; the read-out device 50 comprises the transfer gates 51, the separating layer 77, the floating diffusions 52, the diaphragm 80, the diaphragm aperture 81 and also the substrate situated between the diaphragm and the gates, the substrate being of the same type as the semiconductor substrate 21 in the conversion region 20. The conversion region 20 comprises the semiconductor substrate 21, the rear-side electrode 22, and the diaphragm 80. The substrate has a thickness of approximately 50 micrometers.

The reflected IR radiation 90 (IR: Infrared) penetrating into the semiconductor substrate 21 below the drift gate via the transparent rear-side electrode 22 induces electron-hole pairs 24 in the semiconductor substrate. The photoelectrons are attracted toward the drift gate through the space charge zone formed by the drift gate 31.

The drift gate has a potential of approximately 4 V. The number of attracted photoelectrons 25 is proportional to the received radiation intensity.

A modulated potential can be applied to the modulation gates 32, the maximum of the potential lying between the potentials of the drift gate 31 and of the storage gate 41 and the minimum of the potential lying below that of the drift gate 31. The potential of the modulation gate modulates approximately between the values 0 V and 5 V.

The two modulation gates are operated with inverse potentials with respect to one another, that is to say that the potential of one modulation gate is 0 V if that of the other modulation gate is positive, and vice versa. One modulation gate is then always at 0 V, and the other modulation gate at 5 V.

A potential minimum, that is to say here 0 V, leads to a potential barrier for the photoelectrons below the drift gate, such that no photoelectrons can pass to the storage gate assigned to the modulation gate. A potential maximum, that is to say here 5 V, leads to the photoelectrons flowing away below the drift gate past the modulation gate into the storage gate assigned thereto.

By applying to the two modulation gates a respective potential corresponding to signals that are respectively the inverse of one another, the flow of the photoelectrons generated by the received radiation intensity is directed in a manner corresponding to a selector switch. The resultant flow of the photoelectrons below the modulation gates corresponds to a multiplication, i.e. a correlation of the corresponding sinusoidal signals or rectangular signals with the received radiation signal.

A potential higher than that applied to the drift gate is applied to the storage gates and the latter collect the photoelectrons reciprocally among one another in accordance with the status of the modulation gates. The storage gates have approximately the potential of 10 V. The charges accumulated below the storage gates as a result of the photoelectrons correspond to the correlation values. The correlation values are thus present in the charge domain. The accumulation of the photoelectrons below the corresponding storage gates corresponds to a temporal integration of the abovementioned correlation of correlation signal and received radiation signal.

In order to detect the photoelectrons accumulated below the storage gates, on the one hand the potential of the modulation gates is put at 0 V in order to form a potential barrier for the photoelectrons in the direction of the drift gate. On the other hand, the potential of the transfer gates is raised to a medium value, for example 6 V, in order to enable the photoelectrons to flow away conditionally in the direction of the corresponding floating diffusions.

The positive potential of both storage gates is then reduced in parallel from approximately 10 V by means of a time ramp. The varying added potential here comprising the decreasing positive potential applied to the storage gates and the negative potential of the charge situated below determines whether charge can flow away via the transfer gates. In this case, the reduction process is classified into three phases. In a first phase of the time ramp, for both storage gates the added potential is still more positive than the constantly and equally positive potential of the transfer gates, and no charge flows away. In a subsequent second phase of the time ramp, said added potential is more positive for one storage gate and more negative for the other storage gate than the constant and equally positive potential of the transfer gates. As a result, charge below the storage gate having the more positive added potential flows away via the assigned transfer gate into the assigned floating diffusion, such that the added potential is again equal to the potential of the corresponding transfer gate. In a final third phase of the time ramp, the added potentials of both storage gates are higher than the constantly equal potentials. As a result, below both storage gates charges flow away via the respectively assigned transfer gate into the respectively assigned floating diffusion.

The quantity of charge of the one charged floating diffusion is then converted into a corresponding voltage by means of a source follower and is processed further.

What all the exemplary embodiments and developments of the present invention have in common, however, is that the array is divisible and/or divided into at least two array regions, wherein the at least two array regions correspond in each case to scatterings at objects at different distances from the monitoring region and/or different brightnesses of the received radiation, and the receiving elements respectively arranged in different array regions are settable and/or set to detect with mutually different light sensitivities.

LIST OF REFERENCE SIGNS

1 Optoelectronic sensor device
2 Laser scanner
3 Receiving device
4 Array/receiving elements
5 Floating diffusion
6 Signal amplifier
7 Control device
7' Line to the amplifier
7" Line to the floating diffusion
8 Evaluation device
9 Output signal
10 Receiving element/sensor pixel
11 Boundary
20 Conversion region
21 Semiconductor substrate
22 Rear-side electrode
24 Electron-hole pairs
25 Photoelectrons
30 Separating device
31 Drift gate
32 Modulation gate
40 Storage device
41 Storage gate
50 Read-out device
51 Transfer gate
52 Floating diffusion
77 Separating layer
80 Diaphragm
81 Diaphragm aperture
Incident radiation B Masked-out array region
O Object
U Monitoring region
R Backscattered light
S Emitted light
OPT Receiving optical unit

The invention claimed is:

1. An optoelectronic sensor device for detecting an object within a monitoring region, comprising:
    a receiving device for receiving backscattered light after the scattering of an emitted light beam at the object, the receiving device having an array of at least two receiving elements, the at least two receiving elements being settable with regard to light sensitivity, receiving the backscattered light and separating photoinduced charge carrier pairs in the received backscattered light into photoinduced charge carriers, a floating diffusion converting the photoinduced charge carriers into voltage, a control device connected to at least the floating diffusion and controlling amplification of the voltage and a brightness of the received backscattered light, and a receiving optical unit for imaging the received backscattered light on the array, wherein the array is one of divisible into, or divided into, at least two array regions, wherein the at least two array regions correspond in each case to scatterings at objects at one of different distances from the monitoring region or differences in the brightness of the received backscattered light, and wherein the at least two receiving elements respectively are arranged in different array regions, and are one of settable to, or set to, detect with mutually different light sensitivities, wherein the at least two receiving elements detect with different light sensitivities,
    wherein at least one receiving element of the at least two receiving elements can be switched off, and
    wherein in response to a brightness of the backscattered light received by the at least one receiving element in at least one array region of the at least two array regions, the controller is configured to reduce the light sensitivity of the at least one receiving element, thereby defining a completely masked-out region.

2. The sensor device according to claim 1, wherein one of the receiving elements are configured as photodiodes or the receiving optical unit is configured as a lens or the receiving optical unit comprises a lens.

3. The sensor device according to claim 1, wherein the receiving device comprises a signal amplifier, settable in respect of the gain, for amplifying the received light converted into one of charge carriers or a voltage in order to set the light sensitivity.

4. The sensor device according to claim 1, wherein the floating diffusion is configured to be settable with respect to the magnitude of the voltage into which the quantity of photoinduced charge carriers is converted, in order to set the light sensitivity.

5. The sensor device according to claim 1, wherein the receiving device is configured to set the number of channels for converting light into one of electrical charge carriers or the number of channels of the floating diffusion for converting the photoinduced charge carriers into a voltage, such that the light sensitivity is variable by means of setting the conversion gain.

6. The sensor device according to claim 1, wherein the control device further classifies the array into the at least two array regions.

7. The sensor device according to claim 1, wherein the control device is further configured to switch off of the at least one of the receiving elements to define the completely masked-out region.

8. The sensor device according to claim 1, wherein the array is configured as a two-dimensional array.

9. The sensor device according to claim 8, wherein the array is configured as a 3D imager.

10. The sensor device according to claim 1, further comprising a transmitting device for emitting radiation, including for scanning the monitoring region.

11. The sensor device according to claim 1, wherein the sensor device is one of a laser scanner device or a LIDAR apparatus.

12. The sensor device according to claim 1, wherein the receiving device has a matrix of receiving elements.

13. A method for controlling an optoelectronic sensor device, comprising:
    using an optoelectronic sensor device for detecting an object within a monitoring region, including for one of locating or determining distance, comprising a receiving device for receiving light backscattered after the scattering of an emitted light beam at the object, wherein the receiving device has an array of at least two receiving elements for detecting radiation and a receiving optical unit for imaging the received radiation on the array,
    separating photoinduced charge carrier pairs in the received backscattered light into photoinduced charge carriers, and using a floating diffusion to convert the photoinduced charge carriers into voltage,
    wherein the array is divided into at least two array regions, wherein the at least two array regions correspond in each case to scatterings at objects at different distances from the monitoring region and/or different brightnesses of the received radiation,
    wherein the at least two receiving elements are settable with respect to their light sensitivity depending on their position in the respective array regions, are set with mutually different light sensitivities, and detect with different light sensitivities,
    wherein at least one receiving element of the at least two receiving elements can be switched off, and
    wherein in response to a brightness of the backscattered light received by the at least one receiving element in at least one array region of the at least two array regions, the controller reduces the light sensitivity of the at least one receiving element, thereby defining a completely masked-out region.

14. The method according to claim 13, wherein a brightness measurement of the radiation received by the individual receiving elements is performed before the setting of the light sensitivity of the at least two receiving elements.

15. The method according to claim 13, wherein the individual array regions are classified in each case according to distances of the objects at which the emitted radiation is scattered in the monitoring region.

16. The method according to claim 13, wherein the light sensitivity is one of set by a procedure in which:
    the signal gain of the signal brought about by received light is one of converted into electrical charge carriers or into a voltage or
    a magnitude of the voltage into which the quantity of photoinduced charge carriers is converted by the floating diffusion is set or a number of channels for converting light into electrical charge carriers or a number of channels of the floating diffusion for converting the photoinduced charge carriers into a voltage is set.

17. The method according to claim 13, wherein the sensor device is one of a laser scanner device or a LIDAR apparatus.

18. The method according to claim 13, wherein the receiving device has a matrix of receiving elements.

* * * * *